(12) United States Patent
Osoinach et al.

(10) Patent No.: US 9,323,399 B2
(45) Date of Patent: Apr. 26, 2016

(54) CAPACITIVE TOUCH PAD WITH ADJACENT TOUCH PAD ELECTRIC FIELD SUPPRESSION

(75) Inventors: Bryce T. Osoinach, Phoenix, AZ (US); Lawrence T. Roshak, Chandler, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 1441 days.

(21) Appl. No.: 12/731,510

(22) Filed: Mar. 25, 2010

(65) Prior Publication Data

US 2011/0232976 A1    Sep. 29, 2011

(51) Int. Cl.
*G06F 3/041* (2006.01)
*G06F 3/044* (2006.01)

(52) U.S. Cl.
CPC .............. *G06F 3/044* (2013.01); *G06F 3/0418* (2013.01)

(58) Field of Classification Search
USPC ........................... 345/173–175; 200/512, 600
See application file for complete search history.

(56) References Cited

U.S. PATENT DOCUMENTS

| | | | | |
|---|---|---|---|---|
| 5,239,152 A * | 8/1993 | Caldwell et al. | ............... | 200/600 |
| 6,137,072 A * | 10/2000 | Martter et al. | ................ | 200/512 |
| 6,897,390 B2 * | 5/2005 | Caldwell et al. | ............... | 200/512 |
| 7,253,809 B2 * | 8/2007 | Boyd et al. | ..................... | 345/176 |
| 2002/0154250 A1 * | 10/2002 | An | .................................. | 349/12 |
| 2006/0007171 A1 | 1/2006 | Burdi et al. | | |
| 2008/0259053 A1 * | 10/2008 | Newton | ........................ | 345/175 |

* cited by examiner

*Primary Examiner* — Calvin C Ma
(74) *Attorney, Agent, or Firm* — Sherry W. Schumm

(57) ABSTRACT

A capacitive touch pad includes an electrode board, a plurality of capacitive touch sensor pads, and a cover. The electrode board has touch sensor circuitry formed thereon. The plurality of capacitive touch sensor pads is formed in an array over the touch pad circuitry of the printed circuit board. The plurality of capacitive touch sensor pads is spaced apart by a predetermined distance to form spaces between the pads of the plurality of capacitive touch sensor pads. The cover is positioned over and covering substantially all of the plurality of capacitive touch sensor pads. The cover has a first cavity with a first depth, where the first cavity is shaped to form an air gap between the pads of the plurality of capacitive touch sensor pads to dampen capacitive coupling between adjacent touch pads.

20 Claims, 3 Drawing Sheets

CAPACITIVE TOUCH PAD WITH ADJACENT TOUCH PAD ELECTRIC FIELD SUPPRESSION

BACKGROUND

1. Field

This disclosure relates generally to capacitive touch pads, and more specifically, to a capacitive touch pad with adjacent touch pad electric field suppression.

2. Related Art

Touch sensors have been available for a number of years as a relatively inexpensive alternative to mechanical switches. One type of touch sensor, commonly known as a capacitive touch sensor, or pad, detects a change in capacitance when an object, such as a human finger, interacts with an electric field. In an application such as a telephone touch pad, a number of capacitive touch pads are arranged as an array, or matrix of touch pads spaced apart and arranged as the telephone design allows.

When designing capacitive touch pads, it can be difficult to isolate touch pad activations between adjacent pads. A capacitive coupling between adjacent pads may result in unintentional touch pad activations of adjacent pads. This problem is even more acute in small handheld devices having a relatively small total surface area for the touch pads. One way to suppress the capacitive coupling is to use a ground ring around each pad. However, the use of ground rings requires additional surface area that may not be available on small pads. Another way to isolate and prevent adjacent pad detection is in the detection algorithm software used by the detection hardware to detect pad touches. A problem with the detection algorithm is that sometimes the adjacent pad capacitance can be nearly the same as the capacitance of the touched pad.

Therefore, what is needed is a capacitive touch pad that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
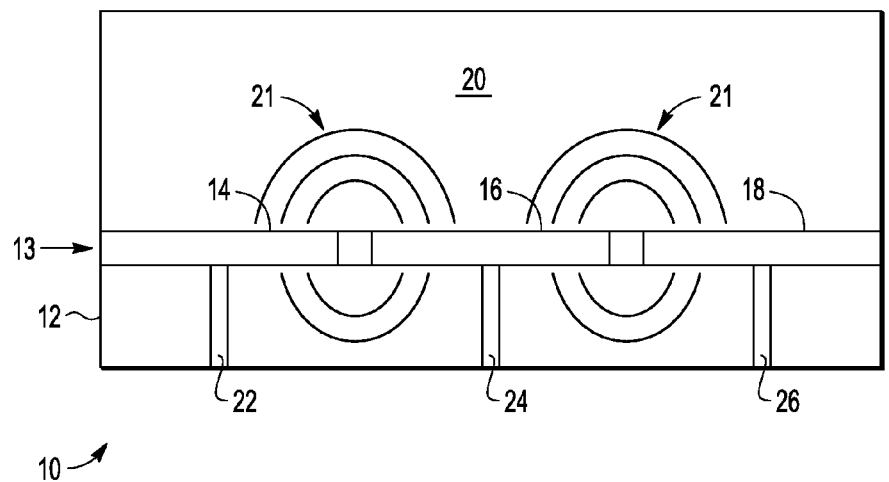
FIG. 1 illustrates a cross-sectional view of a capacitive touch pad in accordance with the prior art.

Generally, there is provided, a capacitive touch pad that suppresses, or dampens, an electric field between adjacent touch pads. In one embodiment, the capacitive touch pad includes an electrode board having a plurality of capacitive touch sensors. A cover, or overlay, is positioned over the capacitive touch sensors. In one embodiment the cover is formed from acrylic or other material having a relatively low dielectric constant. The electric field is suppressed by forming air gaps in the cover in areas between the touch pads. The air gaps dampen the electric fields that cause the capacitive coupling between adjacent pads. The air gaps allow a processor to receive better touch data and therefore have better accuracy when interpreting the touch data. Combining the use of air gaps between pads with a detection algorithm having adjacent pad suppression can provide even better touch pad reliability. In another embodiment, air gaps are formed in both the cover and in the electrode board.

In one aspect there is provided a capacitive touch pad, comprising: an electrode board having touch sensor circuitry formed thereon; a plurality of capacitive touch sensor pads formed in an array over the touch pad circuitry of the printed circuit board, the plurality of capacitive touch sensor pads spaced apart by a predetermined distance to form spaces between the pads of the plurality of capacitive touch sensor pads; and a cover positioned over and covering substantially all of the plurality of capacitive touch sensor pads, the cover having a first cavity with a first depth, the first cavity being shaped to form an air gap between the pads of the plurality of capacitive touch sensor pads. The electrode board may be characterized as being a printed circuit board. The electrode board may comprise a second cavity with a second depth, the second cavity being shaped to align with the spaces between the pads of the plurality of capacitive touch sensor pads. The second depth may be equal to a thickness of the electrode board. The second cavity may comprise a plurality of holes formed to align with the spaces between the pads of the plurality of capacitive touch sensor pads. A width of the first cavity may be equal to the predetermined distance. The first depth may be less than a thickness of the cover. Each of the plurality of touch pad sensor pads may be rectangular in shape.

In another aspect there is provided a capacitive touch pad, comprising: an electrode board having touch sensor circuitry formed thereon; a plurality of capacitive touch sensor pads formed in an array over the touch pad circuitry of the printed circuit board, the plurality of capacitive touch sensor pads spaced apart by a predetermined distance to form spaces between the pads of the plurality of capacitive touch sensor pads; and a cover positioned over and covering substantially all of the plurality of capacitive touch sensor pads; wherein the electrode board has a first cavity with a first depth, the first cavity being shaped to form an air gap between the pads of the plurality of capacitive touch sensor pads. The cover may have a second cavity with a second depth, the second cavity shaped to align with the spaces between the pads of the plurality of capacitive touch sensor pads. The second depth may be less than a thickness of the cover. The first cavity may comprise a plurality of holes formed to align with the spaces between the pads of the plurality of capacitive touch sensor pads. The first depth may be equal to a thickness of the electrode board. A width of the first cavity may be equal to the predetermined distance. The cover may be formed from acrylic.

In yet another aspect there is provided a capacitive touch pad, comprising: an electrode board having touch sensor circuitry formed thereon; a plurality of capacitive touch sensor pads formed in an array over the touch pad circuitry of the printed circuit board, the plurality of capacitive touch sensor pads spaced apart by a predetermined distance to form spaces between the pads of the plurality of capacitive touch sensor pads; and a cover positioned over and covering substantially all of the plurality of capacitive touch sensor pads; wherein the cover has a first cavity with a first depth, the first cavity shaped to form an air gap between the pads of the plurality of capacitive touch sensor pads; and wherein the electrode board has a second cavity with a second depth, the second cavity being shaped to form an air gap between the pads of the plurality of capacitive touch sensor pads. The second cavity may comprise a plurality of holes formed to align with the spaces between the pads of the plurality of capacitive touch sensor pads. The second depth may be equal to a thickness of the electrode board. The first depth may be less than a thickness of the cover. Each the plurality of capacitive touch sensor pads may be rectangular in shape.

FIG. 1 illustrates a cross-sectional view of capacitive touch pad 10 in accordance with the prior art. Capacitive touch pad 10 includes an electrode board 12, a conductive layer 13 having a plurality of capacitive touch sensors 14, 16, and 18, and a cover 20. Capacitive touch pad 10 has been simplified for the purposes of brevity and clarity. Electrode board 12 can be formed from a variety of materials. For example, electrode board 12 can be a conventional multi-layer or single layer printed circuit board (PCB) formed using FR4 (flame retardant 4) a reinforced epoxy laminate. In another embodiment, electrode board 12 may be formed from a flexible material. A conductive layer 13 having a plurality of capacitive touch sensors 14, 16, and 18 are formed on electrode board 12. Any number of capacitive touch sensors can be used depending on the application. The plurality of capacitive touch sensors can be formed from many different materials, such as copper, Indium tin oxide (ITO), and the like. Each of the plurality of touch sensors are electrically connected to a capacitive sensing circuit (not shown). Capacitive sensing circuits are well known in the art and will not be discussed herein. In the illustrated embodiment, a via is formed in electrode board 12 corresponding to each touch sensor and a conductor is formed in the via. For example, as illustrated in FIG. 1, a conductor 22 is formed through electrode board 12 and electrically connected to touch pad 14, a conductor 24 is electrically connected to touch pad 16, and a conductor 26 is electrically connected to touch pad 18. A plurality of traces (not shown) is formed on the bottom of electrode board 12 to connect the touch pads to a capacitive sensing circuit. If electrode board 12 has multiple interconnect layers, then the traces could be formed in one or more intermediate layers instead of the bottom. Because it is not necessary to actually touch the capacitive sensors, a cover, or overlay, is generally used over the plurality of capacitive sensors for protection. Cover 20 is shown positioned over the plurality of touch sensors 14, 16, and 18. Cover 20 can be formed from a number of different materials, such as plastic, acrylic, glass, nylon, vinyl, polyester, or the like. Cover 20 can be attached in a number of different ways. For example, an adhesive or one or more clips or screws can be used to attach cover 20 to electrode board 12.

When an object, such as a human finger, is positioned in close proximity to one of the touch pads, such as touch pad 16, an electric field around the touch pad 16 is disturbed, changing a capacitance on touch pad 16. The electric field around touch pad 16 will also interact with adjacent touch pads, such as touch pads 14 and 18, as illustrated in FIG. 1 by electric field lines 21. The electric field interaction causes a capacitive coupling between the pads that can lead to unintentional touch pad activations even though the adjacent touch pads were not "touched". A spacing between the touch pads can affect a strength of the adjacent pad capacitive coupling. Spacing the pads farther apart can reduce the capacitive coupling. However, in some relatively small handheld applications, such as a cell phone or remote control, little surface area is available for the touch pads. The use of a ground ring around each pad for pad isolation may be difficult because of inadequate space. Also, if the capacitive coupling is relatively strong, a software suppression algorithm may not be able to distinguish an actual touched pad from adjacent pad capacitive coupling.

Figure 2:
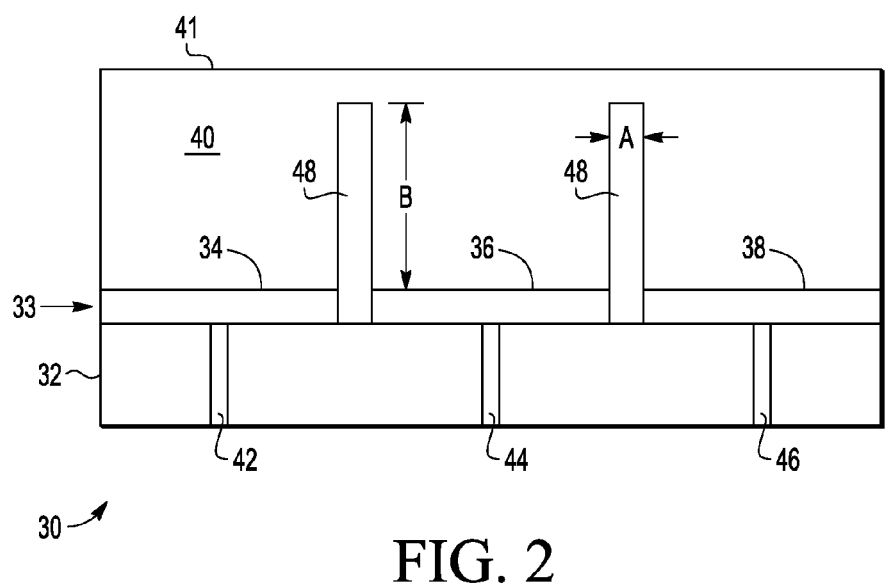
FIG. 2 illustrates a cross-sectional view of a capacitive touch pad in accordance with an embodiment.

FIG. 2 illustrates a cross-sectional view of capacitive touch pad 30 in accordance with an embodiment. Capacitive touch pad 30 includes an electrode board 32, a conductive layer 33 having a plurality of capacitive touch sensors 34, 36, and 38, and a cover 40. Capacitive touch pad 30 has been simplified for the purposes of brevity and clarity. Electrode board 32 can be formed from a variety of materials. For example, electrode board 32 can be a conventional multi-layer or single layer printed circuit board (PCB) formed using FR4 (flame retardant 4) a reinforced epoxy laminate. In another embodiment, electrode board 32 may be formed from a flexible material. A conductive layer 33 having the plurality of capacitive touch sensors 34, 36, and 38 is formed on electrode board 32. Any number of capacitive touch sensors can be used depending on the application. The plurality of capacitive touch sensors can be formed from many different materials, such as copper, Indium tin oxide (ITO), and the like. Each of the plurality of touch sensors are electrically connected to a capacitive sensing circuit (not shown). Capacitive sensing circuits are well known in the art and will not be discussed herein. In the illustrated embodiment, a via is formed in electrode board 32 corresponding to each touch sensor and a conductor is formed in the via. For example, as illustrated in FIG. 2, a conductor 42 is formed through electrode board 32 and electrically connected to touch pad 34, a conductor 44 is electrically connected to touch pad 36, and a conductor 46 is electrically connected to touch pad 38. A plurality of traces (not shown) is formed on the bottom of electrode board 32 to connect the touch pads to a capacitive sensing circuit. If electrode board 32 has multiple interconnect layers, then the traces could be formed in one or more intermediate layers instead of the bottom. Cover 40 is positioned over the plurality of touch sensors 34, 36, and 38. Cover 40 has a touch surface 41. Cover 40 can be formed from a number of different materials, such as plastic, acrylic, glass, nylon, vinyl, polyester, or the like. Cover 40 can be attached in a number of different ways. For example, an adhesive or one or more clips or screws can be used to attach cover 40 to electrode board 32.

The areas between the touch pads are used to dampen the electric field between the pads by taking advantage of the differences in dielectric constants of materials used to form cover 40. By way of example, a dielectric constant (k) of acrylic is in a range between 2.4 and 4.5, a dielectric constant of glass is 7.5, a dielectric constant of polyester film is 3.2, a dielectric constant of flexible vinyl film is in a range between 2.8 and 4.5, and a dielectric constant of air is 1. Air has the smallest dielectric constant. Generally, to reduce capacitive coupling between adjacent touch pads, the illustrated embodiment creates an air gap in cover 40 over the spaces between each of the touch pads. The air gap is formed by creating a cavity 48 in cover 40 in and over the spaces between the touch pads. Cavity 40 is shaped to be generally the same shape as the spaces between the touch pads. In one embodiment, the cavity may be formed by drilling or routing cover 40. In another embodiment, cavity 48 may be created using a molding process for forming cover 40. In another embodiment, cavity 48 may be a plurality of cavities, such as a series of holes between the touch pads. The air gap formed by cavity 48 has a depth labeled "B" and a width labeled "A" in FIG. 2. Because the electric field dampening effect of the air gap is better for increasing width, dimension A should be as wide as possible. In the illustrated embodiment, dimension A is the same as the distance between touch pads. In another embodiment, dimension A may be different. Dimension B is slightly less than a thickness of cover 40. In the illustrated embodiment, the thickness of cover 40 is in a range of between 1.5 and 3.0 millimeters (mm). In another embodiment, the thickness of cover 40 may be different.

Figure 3:
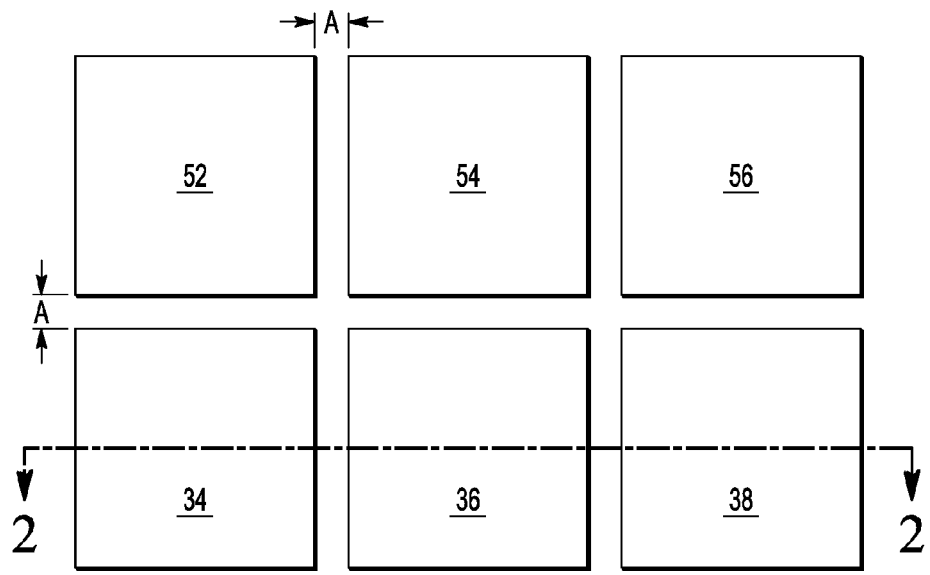
FIG. 3 illustrates a top-down view of the capacitive touch pad sensors of FIG. 2.

FIG. 3 illustrates a top-down view of the plurality of capacitive touch pad sensors 33 of FIG. 2. FIG. 3 illustrates one way the plurality of capacitive touch pad sensors 33 may be arranged on electrode board 32. As can be seen in FIG. 3, each of touch pad sensors 34, 36, 38, 52, 54, and 56 are rectangular in shape and spaced apart by distance A. In another embodiment, the number, shape, and spacing of the plurality of touch pad sensors 33 may be different. By way of example, the plurality of touch pad sensors 33 may alternately be shaped like numbers, letters, or the like. The shape of cavity 33 may align with the shape of the spaces between the touch pads, or it may not. Also, the spacing between the touch pads may vary.

Figure 4:
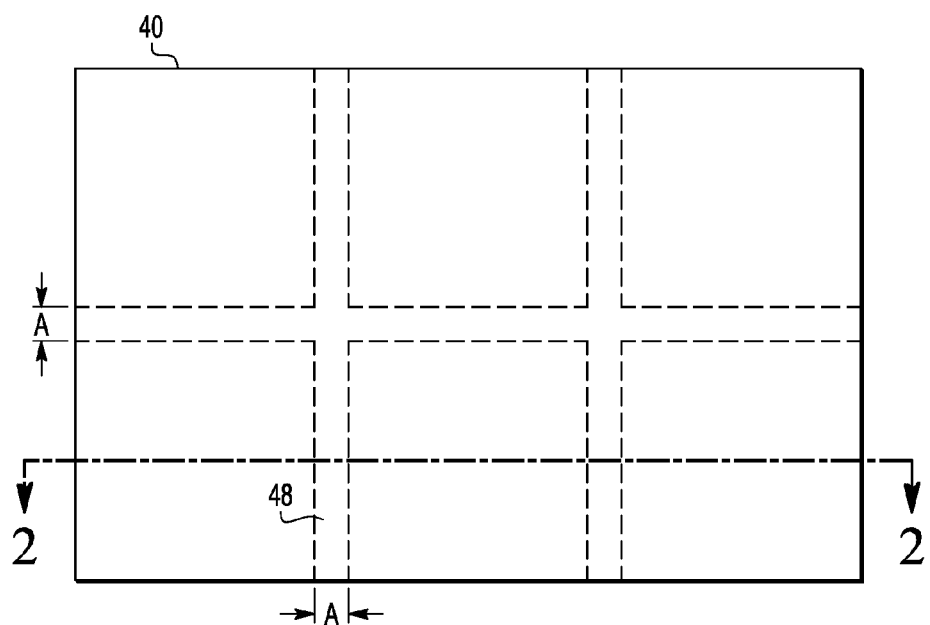
FIG. 4 illustrates a top-down view of the cover of the capacitive touch pad of FIG. 2.

FIG. 4 illustrates a top-down view of cover 40 of the capacitive touch pad of FIG. 2 as viewed from surface 41. Cavity 48 is illustrated using dashed lines. As can be seen, cavity 48 takes the shape of the spaces between touch pads 34, 36, 38, 52, 54, and 56 (FIG. 3), where the spaces have dimension A. In another embodiment, cavity 48 can have a different shape as long as an air gap is created between the touch pads.

Figure 5:
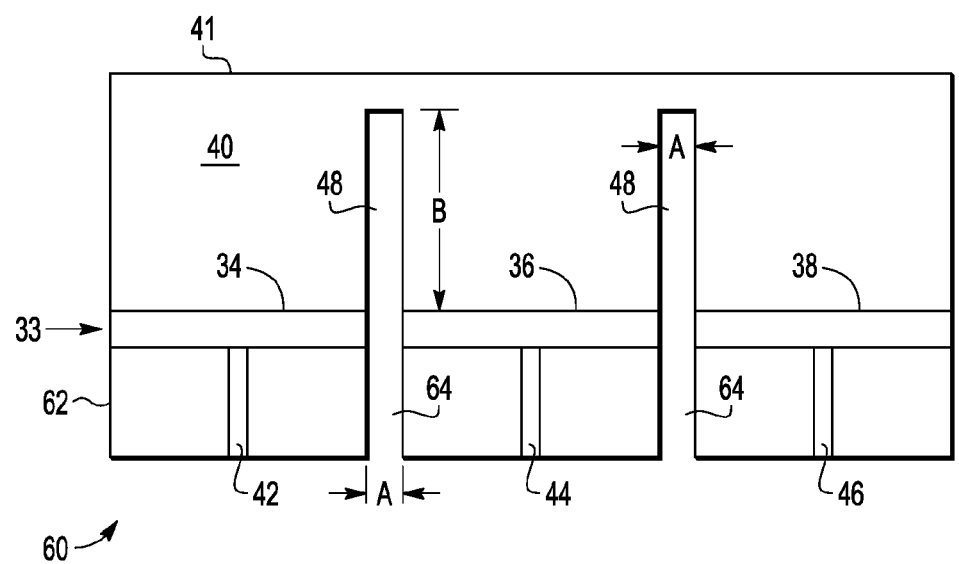
FIG. 5 illustrates a cross-sectional view of a capacitive touch pad in accordance with another embodiment.

FIG. 5 illustrates a cross-sectional view of capacitive touch pad 60 in accordance with another embodiment. Capacitive touch pad 60 is the same as capacitive touch pad 30 except that capacitive touch pad 60 has a cavity 64 formed in electrode board 62 in addition to the cavity 48 formed in cover 40. Cavity 64 is shaped to fill the space between the touch pads. In one embodiment, cavity 64 is a single cavity. A problem with creating a cavity in electrode board 62 is that the electrode board typically includes electrical conductors for electrically connecting the capacitive touch pad sensors to the capacitive sensing circuits (not shown). One way to solve this problem is form cavity 64 as a plurality of cavities so that electrical conductors can also be formed on electrode board 62. In the illustrated embodiment cavity 64 extends all the way through electrode board 62. In another embodiment, cavity 64 may extend only part way through electrode board 62. The use of cavities in both cover 40 and electrode board 62 provides even better electric field dampening between adjacent touch pads.

Figure 6:
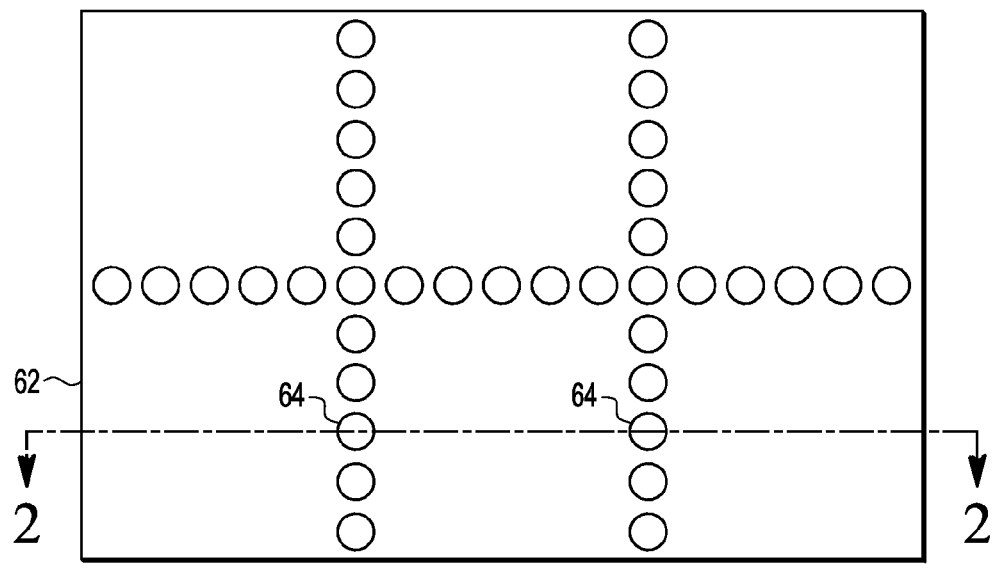
FIG. 6 illustrates a top-down view of the electrode board of the capacitive touch pad of FIG. 5.

FIG. 6 illustrates a top-down view of electrode board 62 of capacitive touch pad 60 of FIG. 5. In FIG. 6, cavity 64 is illustrated as a plurality of cavities 64 to form a plurality of air gaps between the touch pads. As discussed above, this allows the routing of conductors on the electrode board 62. In another embodiment, cavity 64 may be formed as a single cavity as described above for cover 40 and illustrated in FIG. 4.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A capacitive touch pad, comprising:
   an electrode board having touch sensor circuitry formed thereon;
   a plurality of capacitive touch sensor pads formed in an array over the touch pad circuitry of the printed circuit board, the plurality of capacitive touch sensor pads spaced apart by a predetermined distance to form spaces between the pads of the plurality of capacitive touch sensor pads; and
   a cover with a touch surface positioned over and covering substantially all of the plurality of capacitive touch sensor pads, the cover having a first cavity with a first depth, the first cavity being shaped to form an air gap between the pads of the plurality of capacitive touch sensor pads, and the first cavity being aligned with the spaces between the pads of the plurality of capacitive touch sensor pads.

2. The capacitive touch pad of claim 1, wherein the electrode board is characterized as being a printed circuit board.

3. The capacitive touch pad of claim 1, wherein the electrode board comprises a second cavity with a second depth, the second cavity being shaped to align with the spaces between the pads of the plurality of capacitive touch sensor pads.

4. The capacitive touch pad of claim 3, wherein the second depth is equal to a thickness of the electrode board.

5. The capacitive touch pad of claim 3, wherein the second cavity comprises a plurality of holes formed to align with the spaces between the pads of the plurality of capacitive touch sensor pads.

6. The capacitive touch pad of claim 1, wherein a width of the first cavity is equal to the predetermined distance.

7. The capacitive touch pad of claim 1, wherein the first depth is less than a thickness of the cover.

8. The capacitive touch pad of claim 1, wherein each of the plurality of touch pad sensor pads are rectangular in shape.

9. A capacitive touch pad, comprising:
   an electrode board having touch sensor circuitry formed thereon;
   a plurality of capacitive touch sensor pads formed in an array over the touch pad circuitry of the printed circuit board, the plurality of capacitive touch sensor pads spaced apart by a predetermined distance to form spaces between the pads of the plurality of capacitive touch sensor pads; and
   a cover positioned over and covering substantially all of the plurality of capacitive touch sensor pads;

wherein the electrode board has a plurality of first cavities, each with a first depth, the plurality of first cavity being shaped to form a plurality of air gaps between each of the spaces between the pads of the plurality of capacitive touch sensor pads, and the plurality of first cavities being aligned with the spaces between the pads of the plurality of capacitive touch sensor pads.

10. The capacitive touch pad of claim 9, wherein the cover has a second cavity with a second depth, the second cavity shaped to align with the spaces between the pads of the plurality of capacitive touch sensor pads.

11. The capacitive touch pad of claim 10, wherein the second depth is less than a thickness of the cover.

12. The capacitive touch pad of claim 9, wherein the plurality of first cavities comprises a plurality of holes formed to align with the spaces between the pads of the plurality of capacitive touch sensor pads.

13. The capacitive touch pad of claim 9, wherein the first depth is equal to a thickness of the electrode board.

14. The capacitive touch pad of claim 9, wherein widths of the plurality of first cavities are equal to the predetermined distance.

15. The capacitive touch pad of claim 9, wherein the cover is formed from acrylic.

16. A capacitive touch pad, comprising:
an electrode board having touch sensor circuitry formed thereon;
a plurality of capacitive touch sensor pads formed in an array over the touch pad circuitry of the printed circuit board, the plurality of capacitive touch sensor pads spaced apart by a predetermined distance to form spaces between the pads of the plurality of capacitive touch sensor pads; and
a cover with a touch surface positioned over and covering substantially all of the plurality of capacitive touch sensor pads;
wherein the cover has a first cavity with a first depth, the first cavity shaped to form an air gap between the pads of the plurality of capacitive touch sensor pads, and the first cavity being aligned with the spaces between the pads of the plurality of capacitive touch sensor pads; and
wherein the electrode board has a second cavity with a second depth, the second cavity being shaped to form an air gap between the pads of the plurality of capacitive touch sensor pads.

17. The capacitive touch pad of claim 16, wherein the second cavity comprises a plurality of holes formed to align with the spaces between the pads of the plurality of capacitive touch sensor pads.

18. The capacitive touch pad of claim 16, wherein the second depth is equal to a thickness of the electrode board.

19. The capacitive touch pad of claim 16, wherein the first depth is less than a thickness of the cover.

20. The capacitive touch pad of claim 16, wherein each the plurality of capacitive touch sensor pads are rectangular in shape.

* * * * *